(12) United States Patent
Zimmer et al.

(10) Patent No.: US 6,766,645 B2
(45) Date of Patent: Jul. 27, 2004

(54) CONFIGURATION OF AT LEAST TWO EXHAUST GAS TURBOCHARGERS

(75) Inventors: Marko Zimmer, Ingolstadt (DE); Hans-Jurgen Rudolph, Neuburg (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/617,748

(22) Filed: Jul. 14, 2003

(65) Prior Publication Data

US 2004/0011037 A1 Jan. 22, 2004

(30) Foreign Application Priority Data

Jul. 19, 2002 (DE) .......................................... 102 32 738

(51) Int. Cl.$^7$ .............................................. F02B 33/44
(52) U.S. Cl. .......................... 60/612; 60/602; 415/102
(58) Field of Search .................... 60/612, 602; 415/102, 415/98; 417/407

(56) References Cited

U.S. PATENT DOCUMENTS

| | | | | |
|---|---|---|---|---|
| 1,310,682 A | * | 7/1919 | Sherbondy ................... | 60/612 |
| 2,359,615 A | * | 10/1944 | Browne et al. ............... | 60/612 |
| 3,027,706 A | * | 4/1962 | Sprick ......................... | 60/612 |
| 3,469,393 A | * | 9/1969 | Tryhorn ....................... | 60/612 |
| 4,464,902 A | * | 8/1984 | Mendle et al. ................ | 60/612 |
| 5,142,867 A | * | 9/1992 | Bergmann et al. ........... | 60/612 |
| 6,202,415 B1 | * | 3/2001 | Lohmann et al. ............. | 60/612 |

FOREIGN PATENT DOCUMENTS

| | | | | |
|---|---|---|---|---|
| DE | 3735736 A1 | * | 5/1989 | ................... 60/602 |
| DE | 19822874 | | 11/1999 | ........... F02B/37/00 |
| DE | 19948220 | | 1/2001 | ........... F02B/37/00 |
| FR | 645393 | * | 10/1928 | ................. 415/102 |
| JP | 59160027 A | * | 9/1984 | ................... 60/612 |
| JP | 03070818 A | * | 3/1991 | ................... 60/612 |

* cited by examiner

Primary Examiner—Thomas Denion
Assistant Examiner—Thai-Ba Trieu
(74) Attorney, Agent, or Firm—Stevens, Davis, Miller & Mosher, LLP

(57) ABSTRACT

This invention relates to configuration of at least two exhaust gas turbochargers on an internal combustion engine with a plurality of cylinders, in particular in a motor vehicle, in which the two turbine housings are connected to the exhaust gas system of the internal combustion engine and are immediately adjacent to each other and one turbine is always connected to one compressor by means of a drive shaft, the drive shafts being rotatably mounted in corresponding bearing housings. In order to prepare a design which is advantageous from the viewpoint of structure and production technology, it is proposed that the turbine housings are oriented such that the drive shafts be positioned at least approximately in alignment with each other and that the bearing housings be connected to the turbine housings on both sides.

20 Claims, 2 Drawing Sheets

CONFIGURATION OF AT LEAST TWO EXHAUST GAS TURBOCHARGERS

FIELD OF THE INVENTION

The invention relates to a configuration of at least two exhaust gas turbochargers on an internal combustion engine.

BACKGROUND OF THE INVENTION

A configuration such as this is disclosed in DE 198 22 874 A1; in it the two turbine housings integrally cast as one modular unit are mounted in parallel with each other, so that the drive shafts always extend in parallel between exhaust gas turbine and compressor impeller. The two admission channels of the exhaust gas turbine housing are paired; one admission channel may be controlled by way of an integrated valve so that with lower exhaust gas stems initially flow is introduced only into a first exhaust gas turbocharger, while flow is introduced into the second exhaust gas turbocharger with higher exhaust gas flows.

In addition, DE 199 48 220 A1 discloses another configuration of at least two exhaust gas turbochargers on an internal combustion engine, a configuration in which, while the drive shafts have an axis of rotation between the exhaust gas turbines and the compressor impellers, their structure is relatively complicated. Two exhaust gas turbochargers are engaged sequentially in a rather conventional layout. In accordance with the proposal disclosed, a first exhaust gas turbocharger has a hollow drive shaft through which extends the drive shaft of a second exhaust gas turbocharger.

SUMMARY OF THE INVENTION

The object of the invention is to propose a generic configuration which may be installed on an internal combustion engine in a structurally favorable manner, one which is advantageous from the viewpoint of production technology and which represents an efficient, rapidly responding turbocharger.

It is claimed for the invention that this object is attained with the characteristics specified in the claims. Advantageous developments of the invention are also presented in the claims.

It is proposed in accordance with the invention that the turbine housings be oriented so that the drive shafts are at least more or less in alignment relative to each other and so that the bearing housings are attached to the turbine housings on both sides. By preference the turbine housings may be integrally cast as one structural unit.

What is thereby obtained, to advantage, is a structurally compact, rugged turbine housing, which definitely could be produced in more than one part as well, with low weight, and which would yield considerable weight advantages and improvement in the exhaust gas emissions of the exhaust gas turbochargers resulting from lower temperature losses.

In addition, there is obtained, especially in the case of in-line internal combustion engines, a favorable configuration along the longitudinal periphery of the internal combustion engine with relatively free orientation of the connecting flanges adjoining the corresponding admission and discharge channels of the exhaust gas and the combustion air. The bearing housings and compressor housings adjoining on both sides could optionally be designed as similar components which are mounted on the turbine housings only as an alternative.

Lastly, the invention also yields advantages in manufacturing technology such as short machine tool adjustment times and machining times, in particular if the drive shafts in question are positioned in precise alignment between the exhaust gas turbines and the compressor impeller wheels.

Its is also proposed that the pulse charging principle be followed in configuration and mooring of the admission channels of the exhaust gas turbochargers and especially in the case of a four-cylinder in-line internal combustion engine, specific cylinders of the internal combustion engine being connected to the one and the other exhaust gas turbocharger with the exhaust gas connections separated. This permits virtually optimal actuation of the exhaust gas turbochargers even at low internal combustion engine speeds and loads.

Control of the boost pressure may be effected, depending on the structural expenditure selected, separately by way of two bypass valves or by way of a single bypass valve. Preference is to be given to combined boost pressure control with the structural expenditure taken into account, while separate boost pressure control involves more individual interventions into the engine control system with allowance made for efficiency and exhaust gas cleaning criteria.

It may be especially advantageous from the structural viewpoint to integrate the bypass lines and the bypass valves directly into the turbine housings.

BRIEF DESCRIPTION OF THE DRAWINGS

Two exemplary embodiments of the invention are described in greater detail in what follows with reference to the accompanying drawing, in which.

DETAILED DESCRIPTION OF THE INVENTION

Figure 1:
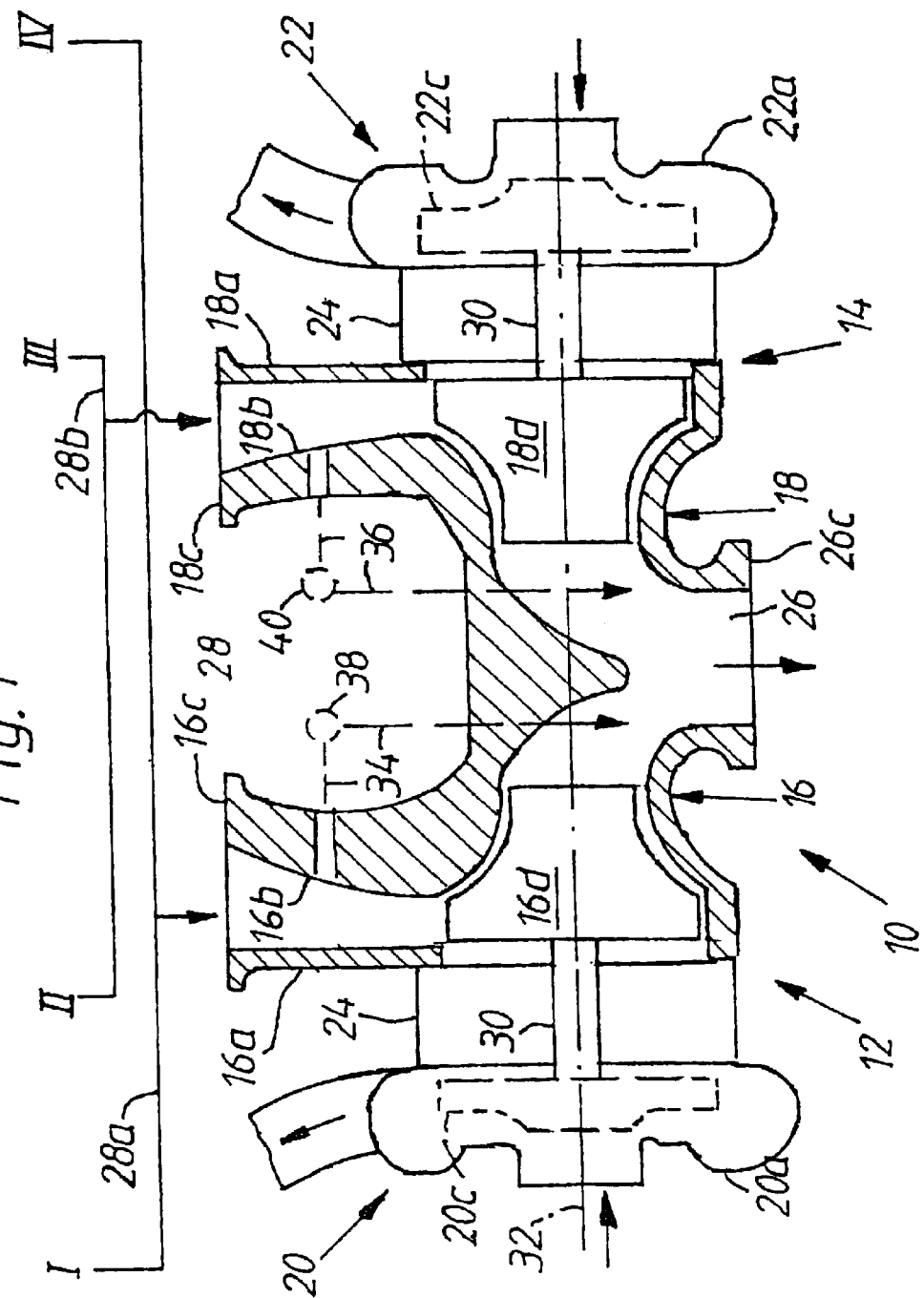
FIG. 1 shows in diagrammatic form a configuration of two exhaust gas turbochargers with modular turbine housing for a four-cylinder internal combustion engine, in a partial longitudinal section, and FIG. 2 the modular turbine housing for a modified configuration as shown in FIG. 1 with bypass lines and a bypass valve integrated into the turbine housing.

In FIG. 1 reference number 10 identifies a configuration which is made up essentially of a first exhaust gas turbocharger 12 and a second exhaust gas turbocharger 14, each consisting of an exhaust gas turbine 16, 18, a compressor 20, 22, and a bearing housing 24 positioned between them. The exhaust gas turbochargers 12, 14 are essentially the same in design both structurally and from the viewpoint of their thermodynamic design.

The two exhaust gas turbochargers 12, 14 are interconnected by way of the structural unit consisting of the first turbine housing 16a and the second turbine housing 18a, these turbine housings being correspondingly integrally cast.

Radial admission channels 16b, 18b and a common discharge channel 26 are formed in the turbine housings 16a, 18a by a conventional method; they are designed in the configuration customary for exhaust gas turbochargers (not shown).

A connecting flange 16c, 18c, 26c is connected to the channels in question 16b, 18b, 26b for attachment of an exhaust gas manifold (lines 28a, 28b) for connection on the exhaust gas side to the cylinders I to IV of the four-cylinder in-line internal combustion engine (not shown) and to the exhaust gas line system discharging into the open (not shown). By way of the individual lines 28a and 28b the cylinders I and IV are separated from each other and the cylinders II and III are interconnected and impinge on either exhaust gas turbine 16 or 18. The ignition gap of the cylinders grouped together on the basis of flow engineering is in each instance 360 crankshaft degrees. The individual lines 28a, 28b could also be cast directly on the corresponding turbine housings 16a, 18b.

Configuration by cylinder, especially in the case of six or more cylinders, is basically also possible and will be correspondingly specified in the application.

The bearing housing 24 and the compressor housing 20a, 22a of the compressors 20, 22 are mounted opposite each other adjoining the exhaust gas turbines 16, 18. The housings in question may be designed to be separate, but also as two structural units each with a bearing housing 24 and a compressor housing 20a, 22a.

Rotatably mounted in the bearing housing 24 is a drive shaft 30 which on one side carries the turbine rotors 16d, 18d extending into the turbine housings 16a, 18a and the compressor impellers 20c, 22c extending into the compressor housings 20a, 22a. As is to be seen, the drive shafts 30 are in alignment (common rotating means axis 32). The admission and discharge channels on the compressor side in the compressor housings 20a, 22a are of conventional design and so are not described in detail.

As is shown in diagram form in FIG. 1, both exhaust gas turbines 16, 18 are provided with a waste gate consisting of a bypass line 34, 36 (indicated only by a broken line) and a bypass valve 38, 40 by means of which exhaust gas from the admission channels 16b, 18b may be diverted past the turbine rotors 16d, 18d into the discharge channel 26. The boost pressure of the internal combustion engine may accordingly be controlled in the combustion air lines not shown upstream from the compressors 20, 22.

The bypass lines 34, 36 and optionally the bypass valves 38, 40 may be integrated as channels directly into the turbine housings 16a, 18a.

Figure 2:
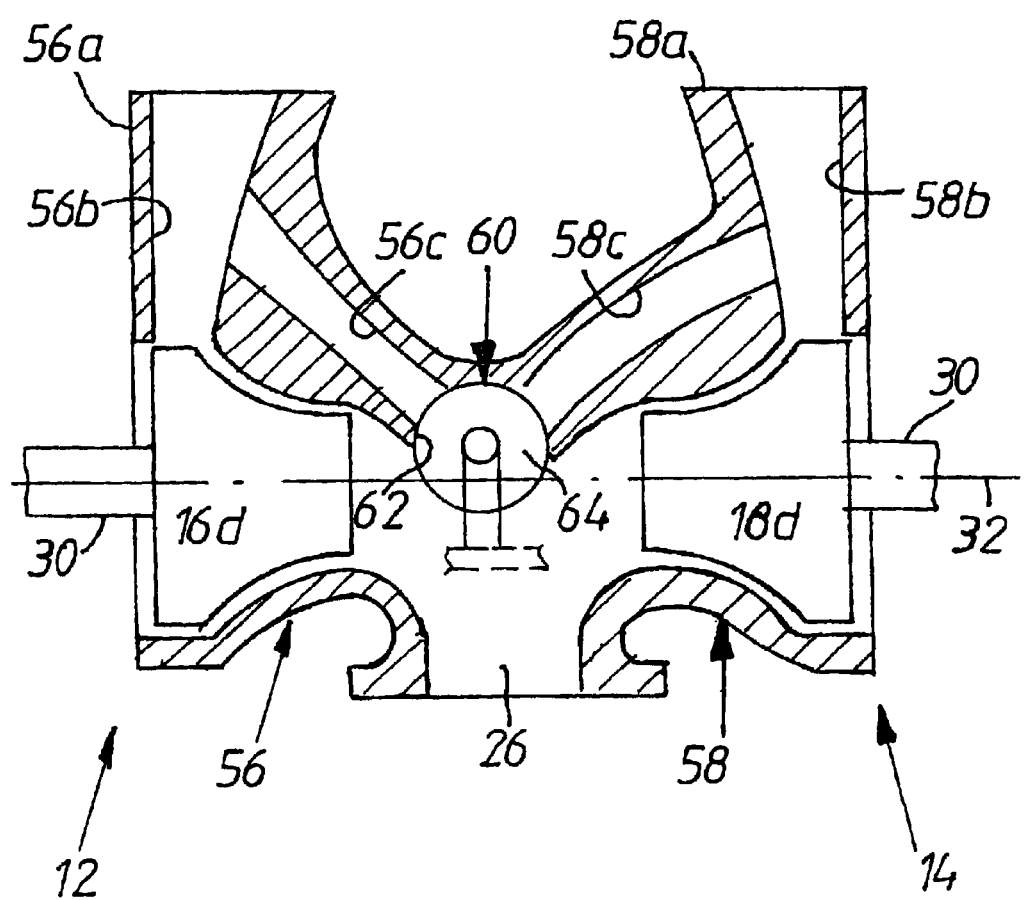

Another embodiment is presented in FIG. 2; the structural components not shown may be identical to those shown in FIG. 1. Identical parts are provided with the same reference numbers.

As is shown in FIG. 2, bypass channels 56c, 58c branching off the admission channels 56b, 58b are integrated into the modular turbine housing 56a, 58a. The bypass channels 56c, 58c are brought together in the area of an also integrated bypass valve 60 approximately in the center of the discharge channel 26 and discharge into an opening 62 of the common discharge channel 26, which opening may be controlled by a movable valve 64 of the bypass valve 60 to open and close. The bypass valve 60 may also be of conventional structural design.

The common bypass valve 60 and the bypass lines 56c, 58c may accordingly be guided by a conventional method past the turbines rotors 16d, 18d for control of the boost pressure of the internal combustion engine or may be diverted into the downstream gas line system.

What is claimed is:

1. A configuration of at least two exhaust gas turbochargers on an internal combustion engine with a plurality of cylinders in which two turbine housings are connected to an exhaust gas system of the internal combustion engine and are immediately adjacent to each other and each turbine is always connected to one compressor by means of a drive shaft, the drive shafts being rotatably mounted in corresponding bearing housings, characterized in that the turbine housings are oriented so that the drive shafts are at least approximately aligned with each other; in that the bearing housings on both sides are connected to the turbine housings; and in that the two exhaust gas turbochargers are each provided with a bypass line which, being brought together in the area of a single bypass valve, permit uniform boost pressure adjustment.

2. The configuration as claimed in claim 1, wherein the turbine housings are integrally cast as one structural unit.

3. The configuration as claimed in claim 2, wherein admission channels of the turbine housings are connected by way of exhaust gas lines separate from each other to specific cylinders of the internal combustion engine.

4. The configuration as claimed in claim 3, wherein, in the case of a four-cylinder in-line internal combustion engine, one admission channel is connected to two cylinders and another admission channel to the other two cylinders, an ignition gap between the cylinders interconnected on an exhaust gas side always amounting to 360 degrees (crankshaft).

5. The configuration as claimed in claim 1, wherein admission channels of the turbine housings are connected by way of exhaust gas lines separate from each other to specific cylinders of the internal combustion engine.

6. The configuration as claimed in claim 5, wherein, in the case of a four-cylinder in-line internal combustion engine, one admission channel is connected to two cylinders and another admission channel to the other two cylinders, an ignition gap between the cylinders interconnected on an exhaust gas side always amounting to 360 degrees (crankshaft).

7. The configuration as claimed in claim 1, wherein the turbine housings have a common discharge channel for exhaust gas leading to an exhaust gas line mounted downstream.

8. The configuration as claimed in claim 1, wherein the bypass lines are integrated into the turbine housings.

9. The configuration as claimed in claim 8, wherein the bypass lines integrated into the turbine housings branch off the admission channels and are brought together approximately in a center between the two turbine housings and wherein the bypass valve discharges through its valve opening into a discharge channel downstream from the exhaust gas turbines.

10. The configuration as claimed in claim 1, wherein the bypass lines integrated into the turbine housings branch off the admission channels and are brought together approximately in a center between the two turbine housings and wherein the bypass valve discharges through its valve opening into a discharge channel downstream from the exhaust gas turbines.

11. A configuration of at least two exhaust gas turbochargers on an internal combustion engine with a plurality of cylinders in which two turbine housings are connected to an exhaust gas system of the internal combustion engine and are immediately adjacent to each other and each turbine is always connected to one compressor by means of a drive shaft, the drive shafts being rotatably mounted in corresponding bearing housings, characterized in that the turbine housings are oriented so that the drive shafts are at least approximately aligned with each other; in that the bearing housings on both sides are connected to the turbine housings; in that the two exhaust gas turbochargers are each provided with separate bypass lines which, each under the control of a bypass valve, permit separate boost pressure adjustments, and in that the bypass lines are integrated into the turbine housings.

12. The configuration as claimed in claim 11, wherein the turbine housings are integrally cast as one structural unit.

13. The configuration as claimed in claim 11, wherein admission channels of the turbine housings are connected by way of exhaust gas lines separate from each other to specific cylinders of the internal combustion engine.

14. The configuration as claimed in claim 13, wherein, in the case of a four-cylinder in-line internal combustion engine, one admission channel is connected to two cylinders and another admission channel to the other two cylinders, an ignition gap between the cylinders interconnected on an exhaust gas side always amounting to 360 degrees (crankshaft).

15. The configuration as claimed in claim 11, wherein the turbine housings have a common discharge channel for exhaust gas leading to an exhaust gas line mounted downstream.

16. A configuration of at least two exhaust gas turbochargers on an internal combustion engine with a plurality of cylinders in which two turbine housings are connected to an exhaust gas system of the internal combustion engine and are immediately adjacent to each other and each turbine is always connected to one compressor by means of a drive shaft, the drive shafts being rotatably mounted in corresponding bearing housings, characterized in that the turbine housings are oriented so that the drive shafts are at least approximately aligned with each other; in that the bearing housings on both sides are connected to the turbine housings; in that the two exhaust gas turbochargers are each provided with separate bypass lines which, each under the control of a bypass valve, permit separate boost pressure adjustments, and in that the bypass lines integrated into the turbine housings branch off the admission channels of the turbine housings and are brought together approximately in a center between the two turbine housings and wherein the bypass valve valves discharge through their valve openings into a discharge channel downstream from the exhaust gas turbines.

17. The configuration as claimed in claim 16, wherein the turbine housings are integrally cast as one structural unit.

18. The configuration as claimed in claim 16, wherein the admission channels of the turbine housings are connected by way of exhaust gas lines separate from each other to specific cylinders of the internal combustion engine.

19. The configuration as claimed in claim 18, wherein, in the case of a four-cylinder in-line internal combustion engine, one admission channel is connected to two cylinders and another admission channel to the other two cylinders, an ignition gap between the cylinders interconnected on an exhaust gas side always amounting to 360 degrees (crankshaft).

20. The configuration as claimed in claim 16, wherein the turbine housings have a common discharge channel for exhaust gas leading to an exhaust gas line mounted downstream.

* * * * *